(12) United States Patent
Donlagic et al.

(10) Patent No.: US 8,655,117 B2
(45) Date of Patent: Feb. 18, 2014

(54) OPTICAL FIBER SENSORS HAVING LONG ACTIVE LENGTHS, SYSTEMS, AND METHODS

(75) Inventors: Denis Donlagic, Maribor (SI); Simon Pevec, Podcetrtek (SI); Edvard Cibula, Starse (SI)

(73) Assignee: University of Maribor, Maribor (SI)

( * ) Notice: Subject to any disclaimer, the term of this patent is extended or adjusted under 35 U.S.C. 154(b) by 187 days.

(21) Appl. No.: 13/046,648

(22) Filed: Mar. 11, 2011

(65) Prior Publication Data
US 2012/0229793 A1 Sep. 13, 2012

(51) Int. Cl.
G02B 6/26 (2006.01)
G02B 6/42 (2006.01)

(52) U.S. Cl.
USPC .................................. 385/12; 385/31; 385/39

(58) Field of Classification Search
USPC ........................................................... 385/12
See application file for complete search history.

(56) References Cited

U.S. PATENT DOCUMENTS

| | | |
|---|---|---|
| 4,295,738 A | 10/1981 | Meltz et al. |
| 4,329,058 A | 5/1982 | James et al. |
| 4,684,215 A | 8/1987 | Shaw et al. |
| 4,928,004 A | 5/1990 | Zimmermann et al. |
| 5,202,939 A | 4/1993 | Belleville et al. |
| 5,301,001 A | 4/1994 | Murphy et al. |
| 5,319,435 A | 6/1994 | Melle et al. |
| 5,394,500 A | 2/1995 | Marchman |
| 5,649,035 A | 7/1997 | Zimmerman et al. |
| 5,694,497 A | 12/1997 | Sansone |
| 6,003,340 A | 12/1999 | Borak et al. |
| 6,539,136 B1 | 3/2003 | Dianov et al. |
| 6,567,173 B1 | 5/2003 | Johannesen |
| 6,898,338 B2 | 5/2005 | Kersey et al. |
| 7,684,657 B2 | 3/2010 | Donlagic et al. |
| 2004/0223679 A1 | 11/2004 | Pickrell et al. |
| 2006/0274323 A1 | 12/2006 | Gibler et al. |
| 2009/0226128 A1* | 9/2009 | Donlagic et al. ................ 385/13 |

FOREIGN PATENT DOCUMENTS

| | | |
|---|---|---|
| WO | WO 89/01614 | 2/1989 |
| WO | WO 2005/121697 | 12/2005 |
| WO | WO 2009/036567 | 3/2009 |

OTHER PUBLICATIONS

Xu et al. "Miniature Temperature-Insensitive Fabry—Pérot Fiber-Optic Pressure Sensor", IEEE Photonics Technology Letters, vol. 18, No. 10, May 15, 2006, pp. 1134-1136.

Vishnubhatla et al. "Shape control of microchannels fabricated in fused silica by femtosecond laser irradiation and chemical etching", Optics Express, May 2009, vol. 17, No. 10, pp. 8685-8695.

(Continued)

*Primary Examiner* — Ryan Lepisto
(74) *Attorney, Agent, or Firm* — Dugan & Dugan, PC

(57) ABSTRACT

Optical fiber sensors adapted to measure strain or pressure are disclosed. The optical fiber sensor has a lead-in optical fiber having an end surface at a forward end, and a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, the first optical element further exhibiting $L/D_o \geq 0.5$. Also provided are systems including the optical fiber sensor, and methods for manufacturing and using the optical fiber sensor. Numerous other aspects are provided.

23 Claims, 10 Drawing Sheets

(56) References Cited

OTHER PUBLICATIONS

Donlagic et al., U.S. Appl. No. 12/758,738, filed Apr. 12, 2010.
Donlagic et al., U.S. Appl. No. 13/046,659, filed Mar. 11, 2011.
Donlagic, U.S. Appl. No. 13/046,666, filed Mar. 11, 2011.
Extended European Search Report of European Application No. 12158880.0 dated Jul. 5, 2012.

* cited by examiner

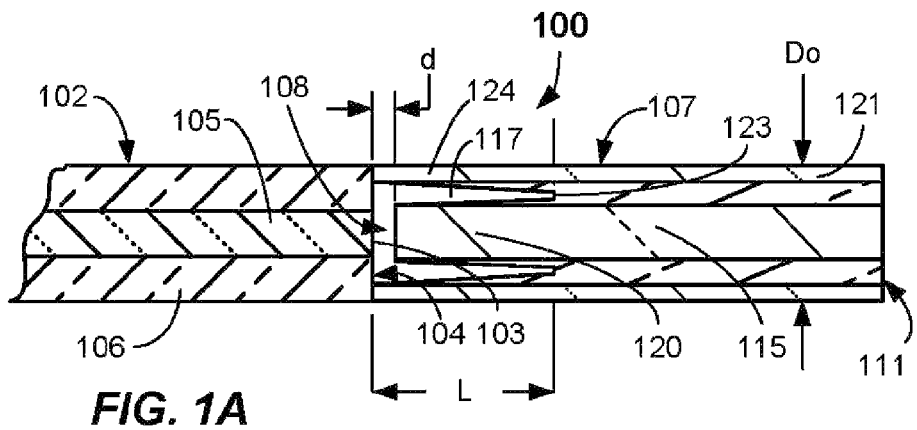
*FIG. 1A*
*FIG. 1B*
*FIG. 1C*
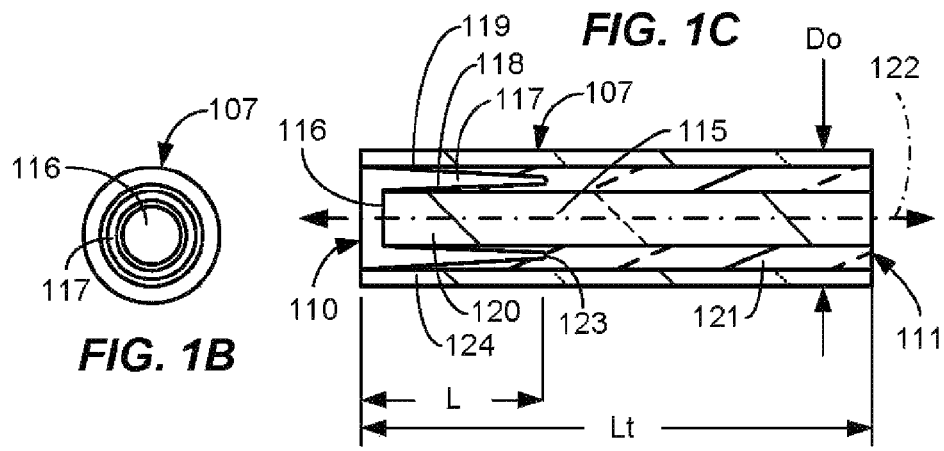
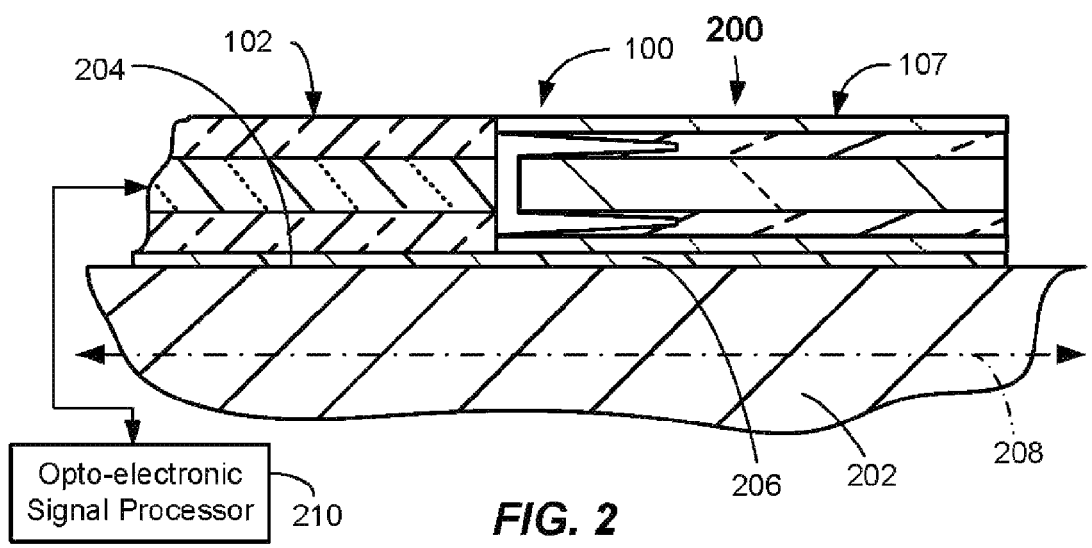
*FIG. 2*

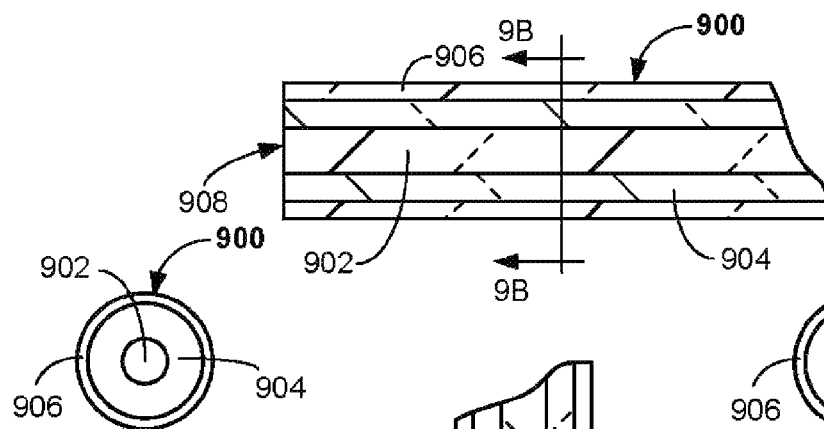
*FIG. 9A*
*FIG. 9B*
*FIG. 9C*
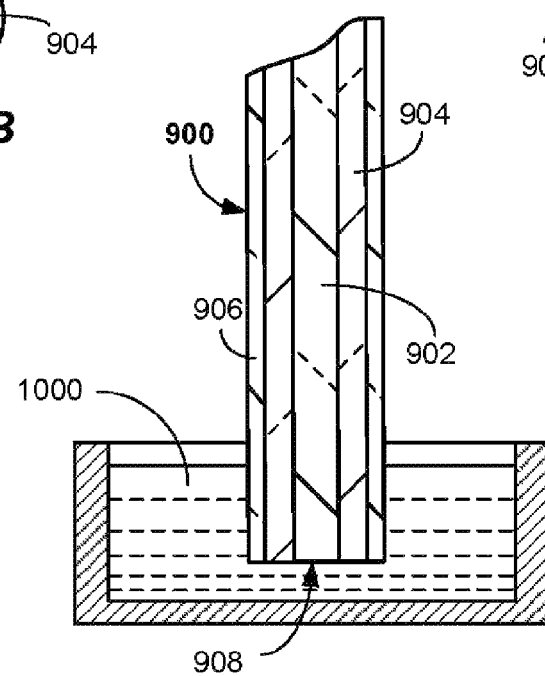
*FIG. 10*
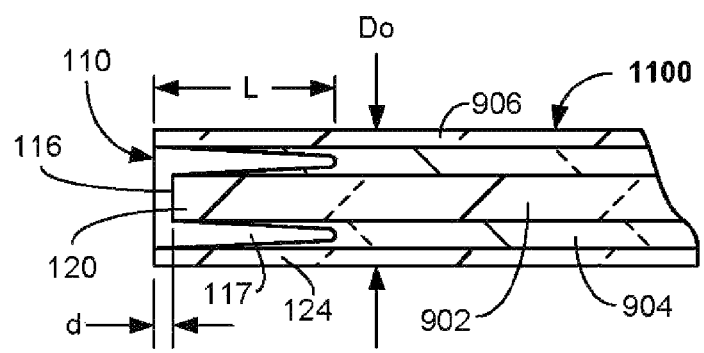
*FIG. 11*

OPTICAL FIBER SENSORS HAVING LONG ACTIVE LENGTHS, SYSTEMS, AND METHODS

FIELD OF THE INVENTION

The present invention relates to optical sensors, and more particularly to optical fiber sensors and systems including them.

BACKGROUND OF THE INVENTION

Optical fiber strain sensors have been the topic of intense research during the last decade as they can be made very small, compact, immune to electromagnetic interference, biocompatible, and can be used at elevated temperature or in relatively harsh chemical environments. Applications for such sensors are, therefore, numerous and may range from structural monitoring to biomedical applications.

Certain fiber optic strain sensors are known in the art. One presented solution includes a specially designed double core fiber. Optical power is exchanged between the two cores as a function of applied strain. However, considerable lengths of optical fiber and complex signal processing may be required to make such systems practical. Other solutions are based on bend loss phenomena in the optical fiber where the applied strain modulates the intensity at a sensor output. For those solutions a relatively simple detection scheme may be applied, but they may have drawbacks in terms of relatively low sensitivity, relatively large size, and relatively low absolute accuracy that is typical for intensity-based sensors based upon bend loss phenomena.

Currently many fiber optic strain sensors are based on fiber Bragg gratings. Bragg grating sensors may however suffer from relatively high temperature sensitivity, require complex signal processing, and may not be miniature in their size (e.g., length). Other solutions to the optical fiber strain sensors rely on polarization effects in optical fibers and measurements of light pulse propagation time in a fiber that is exposed to a measured stress.

Certain strain sensing solutions can be obtained in the form of fiber-based Fabry-Perot sensors. Such fiber-based Fabry-Perot sensors may be appropriate for practical sensing applications since they may be interrogated by variety of straightforward and cost effective, commercially available optoelectronic interrogation techniques. In some applications, a Fabry-Perot interferometer may be used for strain measurements. For example, in the prior art, two perpendicularly cleaved optical fibers may be placed in a glass capillary in such a way to form the short air cavity between the fiber ends. This cavity creates an optical Fabry-Perot resonator that changes its length proportionally to expansion of the glass capillary. One drawback of this approach is in the use of adhesive and not well-defined point where fiber adheres to the capillary as the adhesive randomly penetrates the gap between fiber and capillary. Furthermore, the adhesion between capillary and fiber may impose thermal, mechanical, and chemical stability limitations. The outer diameter of such sensor is always considerably larger than the fiber diameter, which increases its size and may limit its possible applications and packaging options. Friction between the fiber and the capillary may cause sensor hysteresis. Furthermore, the production process of such capillary sensors may be complex and may involve number of precision alignment steps.

In another prior system, a hollow core optical fiber is used to create a spacer between two perpendicularly cleaved fibers. In this case, the sensor (hollow core optical fiber) has the same diameter as optical fibers but it relies on manufacturing and splicing of the hollow core optical fiber to a standard optical fiber which presents its own difficulties. In other embodiments, solutions including a concave cavity are used instead of hollow core fiber or capillary. In some embodiments, the creation of a strain sensitive cavity may be provided by an etching process. While such prior art optical sensors may eliminate some of the drawbacks of capillary-type sensors, they may suffer from limited sensitivity.

In prior art all-fiber designs, the cavity length is varied and converted into cavity length change under influence of an applied strain. The sensor sensitivity to the strain can be incensed by increasing the cavity length. However, this may lead to high optical losses, low interference fringe visibility and overall sensor signal degradation. In one solution, an air cavity is replaced by a fiber that can guide the light. For example, a section of single mode fiber is inserted between two semi-refractive mirrors to create a Fabry-Perot interferometer. While such solution allows for arbitrary resonator length, it may suffer from high temperature sensitivity induced by fiber core refractive index temperature dependence and may require a complex manufacturing procedure that involves vacuum deposition of mirrors onto the individual fiber surfaces. Furthermore, long Fabry-Perot cavities may require more complex signal processing techniques as the free spectral range of long cavity becomes narrow, requiring higher resolution spectrometric sensor signal interrogation techniques.

Furthermore, many, if not all, fiber Fabry-Perot strain sensors known in the art are made by complex and expensive production procedures that involve multiple production steps, and that are therefore not generally suitable for high volume, cost-effective production.

Thus, it should be recognized that the performance of such optical sensor devices may be limited, and/or manufacturing of such optical sensor devices may be relatively complicated and not cost effective. Therefore, there is a long felt and unmet need for highly effective optical sensor and manufacturing methods thereof.

SUMMARY OF THE INVENTION

In one aspect, an optical fiber sensor is provided. The optical fiber sensor includes a lead-in optical fiber having an end surface at a forward end; a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, the first optical element further exhibiting $L/D_o \geq 0.5$.

In another aspect, a strain measurement system is provided. The system includes an optical fiber sensor adapted to be coupleable to an object undergoing strain, the optical fiber sensor including a lead-in optical fiber and an optical element coupled thereto, the optical element having an outer dimension, Do, and a pedestal including a retracted surface, the retracted surface at least partially defining an optical cavity, a gutter surrounding the pedestal, the gutter having a gutter depth defining an active region of length, L, the first optical element further exhibiting $L/D_o \geq 0.5$; and a signal processor coupled to the optical fiber sensor, the signal processor operable to generate and pass a light signal into the lead-in optical fiber, receive a light signal reflected from at least the retracted surface of the optical element, and determine a strain applied to the object.

In a method aspect, a method of manufacturing an optical fiber sensor is provided. The method includes providing a structure-forming fiber; and micromachining the structure-forming fiber to produce an outer dimension Do, a pedestal, and a gutter surrounding the pedestal having a gutter depth defining an active region of length, L, wherein $L/Do \geq 0.5$.

In a method aspect, a method of manufacturing an optical fiber sensor is provided. The method includes providing a structure-forming fiber having a central portion etchable at a first rate when exposed to an etching medium, a inner cladding portion surrounding the central portion having a second etching rate that is greater than the etching rate of the central portion when exposed to the etching medium, and an annular outer cladding portion surrounding the inner cladding portion having a third etching rate that is less than the etching rate of both the central portion and the inner cladding portion when exposed to the etching medium; and exposing an end of the structure-forming fiber to the etching medium for a sufficient time to produce an outer dimension Do, a pedestal, and a gutter surrounding the pedestal having a gutter depth defining an active region of length, L, wherein $L/Do \geq 0.5$.

In another method aspect, a method of manufacturing an optical fiber sensor is provided. The method includes providing a structure-forming fiber having a central portion having a composition of doped silica, an annular inner cladding portion surrounding the central portion having a composition of doped silica that is preferentially doped to provide an etching rate in an etching medium greater than the central portion, and an outer annulus portion surrounding the gutter portion and having a composition of substantially pure silica to provide an etching rate in the etching medium less than both the central portion and the annular inner cladding portion; and exposing an end of the first optical fiber segment to an etchant for a sufficient time to produce an outer dimension Do, pedestal, and a gutter surrounding the pedestal having a gutter depth defining an active region of length, L, wherein $L/Do \geq 0.5$.

In yet another method aspect, a method of using an optical fiber sensor is provided. The method includes providing an optical fiber sensor having a lead-in optical fiber having an end surface at a forward end, and a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, the first optical element further exhibiting $L/Do \geq 0.5$; coupling at least a portion of the body of the first optical element to an object undergoing strain; passing a light signal into the lead-in optical fiber from a signal processor, the signal processor operable to receive a reflected light signal from at least the retracted surface of the first optical element and determine a strain applied to the object.

In yet another method aspect, a method of using an optical fiber sensor is provided. The method includes providing an optical fiber sensor having a lead-in optical fiber having an end surface at a forward end, and a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, the first optical element further exhibiting $L/Do \geq 0.5$; providing at least a portion of the body of the first optical element in a space undergoing pressure changes; passing a light signal into the lead-in optical fiber from a signal processor, the signal processor operable to: receiving a light signal reflected from at least the retracted surface of the first optical element, and determine a pressure applied based upon length changes in the active region of the first optical element.

Numerous other aspects are provided in accordance with these and other aspects of the invention. Other features and aspects of the present invention will become more fully apparent from the following detailed description, the appended claims, and the accompanying drawings. The drawings are not necessarily drawn to scale.

BRIEF DESCRIPTION OF THE DRAWINGS

FIG. 1A is a cross-sectioned side view of an optical fiber sensor having an optical element according to embodiments of the invention.

FIG. 1B is an end view of the optical element of the optical fiber sensor of FIG. 1A according to embodiments of the invention.

FIG. 1C is a cross-sectioned side view of the optical element of the optical fiber sensor of FIG. 1A according to embodiments of the invention.

FIG. 2 is a cross-sectioned side view of a strain measurement system including the optical fiber sensor of FIG. 1A coupled to an object undergoing strain according to embodiments of the present invention.

FIG. 9A is a cross-sectioned side view of a structure-forming fiber used to manufacture the optical element according to an aspect of the invention.

FIG. 9B is a cross-sectioned side view of the structure-forming fiber of FIG. 9A used to manufacture the optical element taken along section line 9B-9B.

FIG. 9C is a respective cross-sectioned end view of an alternative structure-forming fiber used to manufacture the optical element according to an aspect of the invention.

FIG. 10 illustrates a cross-sectioned side view of an apparatus adapted to expose a structure-forming fiber to an etching medium to form the optical element according to an aspect of the invention.

FIG. 11 illustrates a cross-sectioned side view of an optical element according to an aspect of the invention.

DETAILED DESCRIPTION

Figure 3:
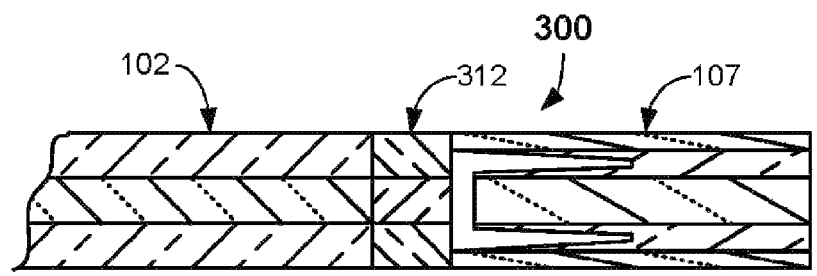
FIG. 3 is a cross-sectioned side view of another embodiment of an optical fiber sensor according to an aspect of the invention.

According to a first aspect, the present invention is an optical fiber sensor (e.g., a Fabry-Perot sensor) adapted for strain measurement and/or measurement of parameters that may be related to strain or elongation of an object. In other embodiments, the optical fiber sensor may be used as a pressure sensor and adapted to measure static and/or dynamically changing pressures. The optical fiber sensor of the present invention allows for separate control over a length (L) of an active region of the optical fiber sensor and over a length (d) of an optical cavity thereof. Accordingly, the present invention allows for design of high sensitivity sensors while also enabling the maintenance of a short optical cavity thereby permitting simple and economical signal interrogation. Furthermore, the optical fiber sensor may utilize a cavity (including a gas or vacuum) and the sensor body may be made entirely from silica and/or or doped silica. Utilizing a gas or vacuum cavity and silica and/or doped silica for the body may provide relatively low temperature sensitivity of the optical fiber sensor.

Accordingly, the present invention provides a relatively low temperature sensitivity, robust, fiber or nearly fiber size optical Fabry-Perot sensor (e.g., a strain or pressure sensor). The optical fiber sensor may have a length (L) of the active region which is relatively large, with arbitrary short cavity length (d) that enables attaining high strain sensitivity, high quality of output signal, and spectral characteristics that may be relatively easy to process.

A manufacturing method for the production of the optical fiber sensor is also disclosed. The method, in some embodiments, includes only one micromachining (e.g., etching step) and one bonding step. The micromachining step may be performed in large batches, which makes the optical fiber sensor of the present invention suitable for high volume, low cost manufacturing.

According to an aspect of the present invention, an optical fiber sensor is provided that is adapted to sense a parameter (e.g., strain) or parameters related to strain. The optical fiber sensor includes a lead-in optical fiber having a forward end. A first optical element (e.g., a single-piece optical element) is provided having a front end coupled to (e.g., bonded) the forward end of the lead-in optical fiber. The first optical element includes an outer dimension, Do, a pedestal with a retracted surface at least partially defining an optical cavity, a gutter surrounding the pedestal, the gutter having a gutter depth defining an active region of length, L, wherein the first optical element further exhibits $L/Do \geq 0.5$. The relatively long sensor active length (L) provides improved strain sensitivity.

In operation, the optical element is flexible in extension and/or compression in response to the parameter (e.g., strain or pressure), and the end surface of the lead-in optical fiber and the forward end of the retracted surface, respectively, define a rearward and a forward reflectors of a sensing Fabry-Perot resonator within the optical fiber sensor of the invention.

Optical fiber sensors in accordance with the embodiments described herein may be sensitive to several different parameters, e.g. strain, mechanical stress, force, pressure, length change, acceleration, vibration, chemical parameters, or combinations thereof that can directly or indirectly cause elongation or compression (e.g., strain or change in length) of the sensor's active length (L). The present invention can be particularly useful for applications where reduced size, immunity to electromagnetic interference (EMI), high thermal stability, and/or low drift are important characteristics.

These and other embodiments of the present invention are further described with reference to FIGS. 1A-22 below.

A first embodiment of the present invention optical fiber sensor 100 is described with reference to FIGS. 1A-1C. The optical fiber sensor 100 of the present invention functions to sense a given parameter, as described herein. The parameter may be physical or chemical parameter. The optical fiber sensor 100 may include a lead-in optical fiber 102 having an end surface 103 at its forward end 104. The end surface 103 may be cleaved to be generally perpendicular to an axial axis of the lead-in fiber 102 extending along the length dimension of the lead-in fiber 102. The lead-in optical fiber 102 may include a core 105 and a cladding 106 and thus may possess a waveguide structure. The core 105 may be cylindrical and a cladding 106 may surround the core 105, for example. The lead-in optical fiber 102 may function to guide a light signal(s) towards its end surface 103, and then also guide a reflected light signal back in an opposite direction. It will be clear to one skilled in the art that the designation of lead-in optical fiber refers to the use of this fiber as a waveguide for the carrying a light signal and is not meant as representative of any particular property or structure of the optical fiber itself. The lead-in optical fiber 102 may be single mode optical fiber, multimode optical fiber. Other types of suitable optical fibers may be used. In some embodiments, the core 105 may be doped silica (e.g., germania-doped silica) and the cladding 106 may be substantially pure silica, for example. In other embodiments, the core 105 may be substantially pure silica and the cladding may be doped silica (e.g., fluorine-doped silica).

The optical fiber sensor 100 further includes an optical element 107, which may be a single-piece optical element, coupled to, and projecting forward from, the lead-in optical fiber 102. The optical element 107, shown in FIG. 1C, has a first end 110, which may be coupled (e.g. directly or indirectly) to the forward end 104 of the lead-in optical fiber 102, and a second end 111 opposite the first end 110. As will be described further herein, coupling between the lead-in fiber 102 and the optical element 107 may be by fusion/fusing via fusion splicing, for example. The first end 110 therefore faces rearwards of the optical element 107 while the second end 111 faces forwards. The designations of "rearward" and "forward" are used throughout the present specification to refer to the orientation of components with respect to light coming in from the lead-in optical fiber 102, and are not indicative of any preferential direction.

By "coupled" it is meant that the optical element 107 is directly connected or interconnected to the lead-in optical fiber 102. In some embodiments, the coupling between the lead-in optical fiber 102 and the optical element 107 may result from the optical fiber 102 and the optical element 107 being directly bonded together, for example. However, the optical element 107 and the end surface 103 of the lead-in optical fiber 102 need not necessarily be in direct contact, and the coupling may be by way of an intermediary component being provided. For example, an additional spacer 312 (see FIG. 3) may be present between the lead-in fiber 102 and the optical element 107 without departing from the scope of the present invention. For example, in more detail, the FIG. 3 embodiment includes an optical fiber sensor 300 having a lead-in optical fiber 102, an optical element 107, and a spacer 312. For example, the spacer 312 may be constructed of germania-doped silica forming the core 312A and a substantially-pure silica material forming the cladding, and may serve to modify, for example focus or collimate, the flied in the lead-in fiber 102. In other embodiments, a graded index cores may be used to provide focusing and collimation. Other spacer materials may be used.

When uninstalled, the optical element 107 is supported in a cantilevered fashion by the lead-in optical fiber 102, that is, no additional component is provided to support the optical element 107 such as would for example be the case for "capillary" type sensors where a base layer supports sensor components and receives the lead-in optical fiber in a channel therein.

In preferred installation configuration, the optical fiber sensor 100 of the invention may be part of a measurement system 200 that is adapted to measure a parameter of an object 202. For example, the optical fiber sensor 100 may be mounted to the object 202 undergoing strain as is shown in FIG. 2. The optical fiber sensor 100 may include a limited section (e.g., from less than a meter to several meters or more in length) of lead-in optical fiber 102. The optical element 107 and possibly part of the lead-in optical fiber 102 may be attached, for example glued or otherwise adhered to a surface 204 of the object 202 that is to be monitored for stress and/or elongation. A layer of adhesive 206, such as an epoxy resin, cyanoacrylate, or other suitable adhesive may be used to adhere or bond the optical fiber sensor 100 to the surface 204 of the object 202. As should be apparent, bending, flexion, vibration, etc. of the object 202 about its neutral axis 208 (shown dotted) will cause localized strain at the surface 204 that may be measured by the optical fiber sensor 100 and measurement system 200. An opto-electronic signal processor 210 may be coupled to the optical fiber sensor 100 and is adapted to send and receive light signals to and from the lead-in optical fiber 102. Any suitable opto-electronic signal processor 210 known in the art may be used to interrogate the optical fiber sensor 100. The lead-in fiber 102 may attached directly to the opto-electronic signal processor 210 or may be connected to one or more additional segments of optical fiber that attach to the opto-electronic signal processor 210.

The optical element 107, shown in FIGS. 1B-1C, further includes an outer dimension Do (e.g., an outer diameter), a solid support base 115 on the forward end 111, a reflective surface 116, and a gutter 117. The reflective surface 116 may be a semi-reflective surface. Air-glass transition causes about 3.6% back reflection. Optionally, an additional optical coating (e.g., $TiO_2$ or $ZrO_2$, etc.) may be added/deposited to the reflective surface 116 surface before splicing to further increase reflectivity. The reflective surface 116 may project rearwards, and is retracted inwardly (e.g., spaced and offset) relative to the first end 110 of the optical element 107. The reflected light signal may include reflection from the end surface 103 and also from at least the retracted surface 116 of the optical fiber sensor 100. The gutter 117 penetrates forward into the solid support base 115 by a distance (L) and surrounds the reflective surface 116 and pedestal 120. The second end 111 may be flat, angle cleaved, or of an arbitrary shape. A total length (Lt) of the optical element 107 can be of any practical length including, for example, lengths between several hundreds of micrometers and lengths that exceed centimeter range and can be thus considered infinite. However, in some embodiments, the optical element 107 may have a tail portion 121 having a length that extends beyond the forward end of the gutter 117 by a distance greater than Do/2, or even Do, or even 5 times Do, or even 10 times Do or more. Other lengths of tail portion 121 may be used.

The reflective surface 116 and gutter 117 in some embodiments may be centered relative to a longitudinal axis 122 the optical element 107. In some embodiments, the optical element 107, reflective surface 116, and gutter 117 may be circular or nearly circular in cross-section. Other cross-sectional geometries may be used. An inner gutter wall 118 and outer gutter wall 119 of the gutter 117 may be parallel to each other in some embodiments, or tilted (e.g., tapered) relative to the longitudinal axis 122. In the depicted embodiment, the inner gutter wall 118 is tilted relative to the optical element longitudinal axis 122 to define a generally conical-shape to the pedestal 120. The pedestal 120 includes the generally planar reflective surface 116 on its terminal rearward facing end. Tapered inner gutter wall 118 and reflective surface 116 defines a frusto-cone shape to form to the pedestal 120 of the optical element 107. The frustoconical shape provides additional mechanical stability and resistance to vibrations and transversal accelerations in case of high sensitivity optical fiber sensors utilizing the relatively deeper gutter 117 of the invention.

The reflective properties of fiber end surface 103 and a retracted reflective surface 116 of the optical element 107 may simply come from the interface between two different media, or be improved by providing a suitable semi-reflective layer onto the appropriate surface. The reflective or semi-reflective layers may, for example, be embodied by a metallic coating, oxide coating, or semiconductor coating of appropriate thickness. Such coatings and other options for providing reflective or semi-reflective layers are well known to those skilled in the art.

The end surface 103 of the lead-in optical fiber 102, and the retracted (e.g., spaced) reflective surface 116 of the optical element 107 define an optical cavity 108 in the optical fiber sensor 100. The optical cavity 108 may be an air or gas containing cavity, a vacuum containing cavity, or low pressure air or gas containing cavity (e.g., sub-atmospheric pressure). The optical cavity length (d) is defined by the distance between reflective surface 116 and the end surface 103 of the lead-in optical fiber 102 or other component. The reflective end surface 116 of the optical element 107 and reflective end surface 103 of the lead-in optical fiber 102 may further define a Fabry-Perot resonator. The end surface 103 and surface 116 may be co-planar, for example. Suitable dimensions are discussed herein below.

The optical fiber sensor 100 is flexible in bending in response to the parameter to be analyzed (strain, vibration, etc.). The optical fiber sensor 100 is primarily sensitive to elongation, more precisely in this embodiment to an elongation of an active region 124 having a generally annular shape and having a length (L) defined by the distance between the first end 110 (e.g., at the forward end 103 of the lead-in optical fiber 102) and a bottom 123 of the gutter 117. In the present invention, the first optical element 107 has a body with an outer dimension, Do, and the gutter has a gutter depth defining the active region of length L. To achieve relatively enhanced strain sensitivity, the first optical element 107 exhibits L/Do≥0.5. In other embodiments, the first optical element 107 comprises L/Do≥1.0, L/Do≥1.5, L/Do≥2.0, or even L/Do≥3.0.

Since the external stress or deformation imposed on the optical fiber sensor 100 is not transferred to the pedestal 120 supporting the reflective surface 116, the axial elongation of active region 124 corresponds to a length change of dimension (d) of the cavity 108. This length change of dimension (d) may be optically measured and determined by the opto-electronic signal processor 210 as shown in FIG. 2.

In accordance with an aspect of the invention, the optical sensor 100 exhibits relatively longer Length (L) of the active region 124, while the optical cavity length (d) of the optical cavity 108 can be set to relatively short practical values by the adjustment of a retraction of the reflective surface 116. As described below, the retraction distance (d) can be controlled by a method according to another aspect of the invention. Having a relatively short optical cavity length (d) and a relatively longer length (L) of the active region 124 is advantageous. This is particularly advantageous for making strain measurements, where a longer length (L) of the active region 124 leads to proportionally larger cavity length change ($\Delta x$) when the optical sensor 100 is exposed to mechanical strain, while a relatively small optical cavity length (d) may provide a relatively low level of optical loss due to beam expansion (spreading) within the optical cavity 108.

A relationship between the optical cavity length change and strain can be estimated as:

$$\Delta x = \epsilon L \qquad \text{Equation (1)}$$

wherein
$\epsilon$ is strain imposed on the optical fiber sensor 100,
$\Delta x$ is a change in cavity length, and
L is the length of the active region 124.

Since the change in cavity length $\Delta x$ is parameter measured by an appropriate opto-electronic signal processor 210, a longer length (L) of the active region 124 therefore leads to higher sensor strain sensitivity. The change in the cavity length $\Delta x$ may, for example, be measured on the basis of interference of reflected light in the Fabry-Perot resonator, and an appropriate optical signal processing system 210 can deduce therefrom a variation in the measured parameter. The optical processing of the signal is adapted to the characteristics of the Fabry-Perot resonator. Sensing by a Fabry-Perot resonator and appropriate signal processing techniques are well known to those skilled in the art and need not to be described further here.

Other physical or chemical parameters that can be related to strain or elongation of the active region 124 may also be measured by presented invention. These parameters may for example be mechanical stress, pressure, force, acceleration, vibration, humidity, presence of liquids such as carbohydrates, as well as other chemical parameters or combinations thereof.

The provision of an optical element embodying the retracted reflective surface 116 surrounded by gutter 117 and active region 124 of relatively long length (L) are advantageous structural features of the present invention. According to some embodiment, the optical element 107 reduces a number of weak and particularly problematic bonding points of the prior art through incorporation of a monolithic design of the optical element 107. This design may increase sensor measurement range through the ability to sustain exposure to higher values of strain, provide improved robustness, and possibly relatively longer term reliability. In addition, manufacture is considerably simplified as compared to prior art methods, as will be seen further below. This may lead to considerable lower manufacturing costs.

According to some exemplary embodiments, the length (L) of the active region 124 may be typically between about 40 μm and about 2000 μm long, between about 125 μm and about 700 μm long, or even between about 170 μm and about 500 μm long (most preferable range). The length (d) of the optical cavity 108 may typically range between about 2 μm and about 50 μm, or even between about 5 μm and about 20 μm. The total length (Lt) of the optical element 107 can be of any practical length, typically between about 100 μm to about 5000 μm, however in many cases it can be up to few meters or more. The typical outer dimension (Do) (e.g., diameter) of the optical element 107 may be between about 80 μm and about 1000 μm.

In some embodiments, the outer dimension (Do) equals to the outer diameter of lead-in fiber 102. For example, typical dimensions of an exemplary optical element 107 may be an outer dimension (Do—diameter) corresponding to about 125 μm, the active region 124 having a length (L) between about 200 μm to 300 μm (about 1.6 to 2.4 times Do), a length (d) of the optical cavity 108 between about 5 μm to about 15 μm, and a total length (Lt) of the optical element 107 of about 325 μm or more. These dimensions are given by way of example and are in no way intended to limit the scope of the present invention.

The optical element 107 is preferably made of inorganic materials, such as combinations of pure silica glass, doped silica glass, composite glass or sapphire, however it could be also made from polymer material or other materials. In some embodiments, the optical element 107 may be manufactured from a length of structure-forming optical fiber. The physical or chemical properties of the material selected need not be homogenous throughout the optical element 107 and may differ along particular axes or in different portions, for example by the provision of a radial distribution of dopants therein.

In some embodiments, the optical element 107 includes a compositional structure wherein the composition of the optical element 107 varies radially. A central portion forming the pedestal 120 may have a cylindrical shape with a higher refractive index as compared to the cladding, as in case of conventional optical fiber core. An inner cladding region which forms the gutter 117 may be an annulus preferentially-doped with a dopant that causes the inner cladding region to exhibit an increased etching rate as compared to the central portion forming the pedestal 120. An outer cladding portion forming the active region 124 and portion of the tail 121 may include an annulus having substantially no dopant (substantially pure silica) so that the etching rate of the annular outer cladding portion is less than the inner cladding portion. The doping rate of the central portion forming the pedestal 120 should be such that the central portion forming the pedestal 120 etches at a rate that is greater than the outer cladding portion. In this manner, etching with an etching medium may provide an axially retracted or offset surface (e.g., reflective surface 116). Etching rates, as discussed above are of course relative, but etching is accomplished by using the same etchant material for each at the same time and under the same conditions.

In one example, the central portion may be a cylinder of germania-doped silica, the inner cladding portion may be and annulus of $P_2O_5$ doped silica, and the outer cladding portion may be an annulus of substantially-pure (undoped) silica. In some embodiments, the central portion may be a cylinder of germania-doped silica including between about 1% and about 20% germania dopant in silica, the inner cladding portion may be and annulus of $P_2O_5$ doped silica including between about 3% and about 20% $P_2O_5$ dopant in silica, or even between 3% and about 35% $P_2O_5$ dopant in silica, and the outer cladding portion may be an annulus of substantially-pure (undoped) silica. Optionally, the central portion may include one or more dopants selected from the group of $TiO_2$, $P_2O_5$, $GeO_2$, or $B_2O_3$, for example. Other dopants or combinations of dopants may be used.

Other practical embodiments and variations are described below with reference to FIG. 4 and FIG. 5. For example, to double a length (L) of the active region 409 of the optical fiber sensor 400, and, thus, double the sensor strain sensitivity, two optical elements 407A and 107 (as previously described) may be joined together in an opposed orientation, as depicted, such that the openings open towards each other. The reflective surfaces 416, 116 of both optical elements 407A, 107 thus form an optical cavity 408. The guidance of light to and from the cavity 408 may be provided either by a refractive index contrast at the interface between the gutter 417 and the pedestal 420 supporting the reflective surface 416 or by building a waveguide structure within the optical element 407A. The waveguide structure may be achieved in the same way as described in FIG. 1C or as otherwise described herein.

Figure 4:
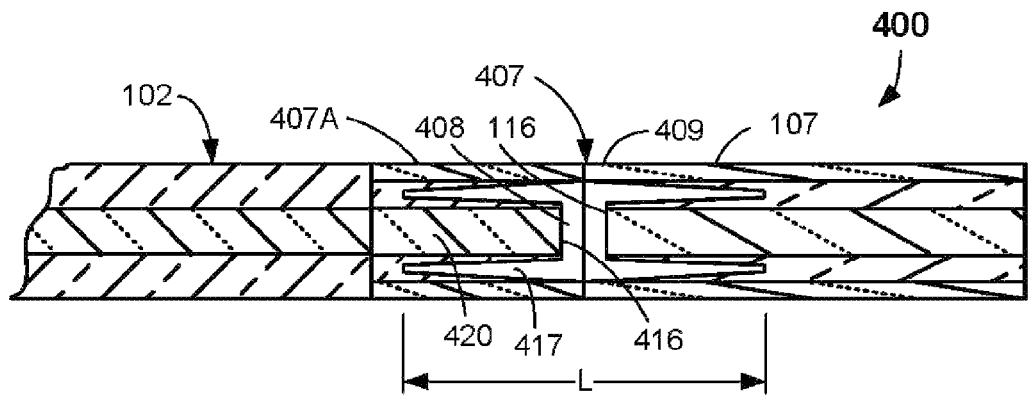
FIG. 4 is a cross-sectioned side view of yet another embodiment of an optical fiber sensor including multiple opposed optical elements according to an aspect of the invention.

In the first alternative embodiment, shown in FIG. 4, the optical element 407A may be bonded (e.g., fusion spliced) to the lead-in fiber 102 and a distance between a bottom of the gutter 417 and the end face of the lead-in fiber 102 may be made as short as practical to minimize optical losses between the lead-in fiber 102 and the pedestal 420 supporting the reflective surface 416. The elements 407A and 107 may be bonded (e.g., fused) together at their respective annular portions. Optical element 407A may be identical as optical element 107 described herein with reference to FIG. 1A-1C.

Figure 5:
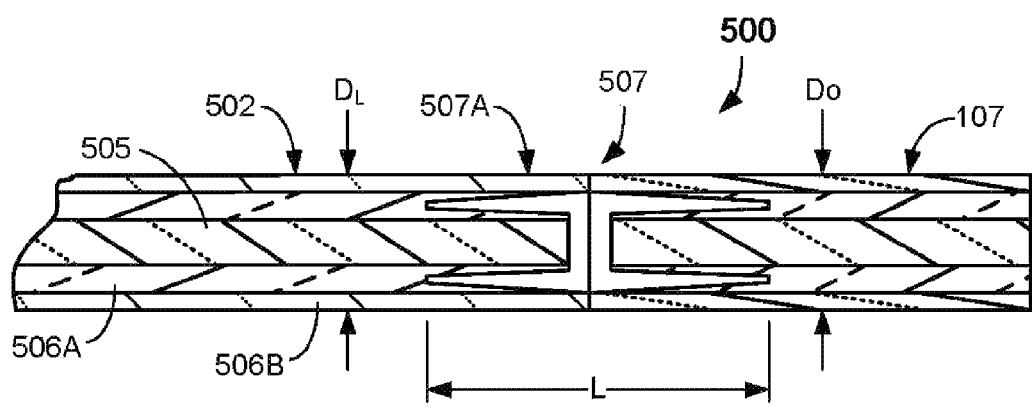
FIG. 5 is a cross-sectioned side view of another embodiment of an optical fiber sensor including an optical element and a gutter thereof formed in a lead-in fiber according to an aspect of the invention.

In another alternative embodiment, an optical fiber sensor 500 is shown in FIG. 5. The optical element 507 includes an optical element 107 as heretofore described coupled to an optical element 507 that is integral with the lead-in fiber 502. In the depicted embodiment, a waveguide structure including a core 505, an inner cladding 506A and an outer cladding 506B is provided. The core 505 may have a cylindrical shape with a higher refractive index as compared to the cladding 506A, as in case of conventional optical fiber core. The inner cladding 506A may be preferentially-doped with a dopant that causes the inner cladding to exhibit an accelerated etching rate as compared to the core 505. The outer cladding 506B may include a slight dopant or no dopant so that the etching rate of the outer cladding is less than the inner cladding 506A. The doping rate of the core 505 should be such that the core 505 etches at a rate that is greater than the outer cladding 406B. For example, the core 505 may be germania-doped silica, the inner cladding 506A may be $P_2O_5$ doped silica, and the outer cladding 506B may be substantially-pure (undoped) silica in the amounts as discussed above. The material composition of the lead-in optical fiber 502 and the optical element 107 may be substantially identical. Likewise, the outer diameter $D_L$ of the lead-in fiber 502 and the outer dimension Do of the optical element 107 may be substantially the same.

In the depicted embodiment, the lead-in optical fiber 502 having the optical element 507A etched into an end thereof may be coupled (e.g., via fusion splicing) to the optical element 107. The waveguide structure of the lead-in optical fiber 502 can support one or more modes, and may be compatible in terms of dimensions of the core and refractive index difference with commercially available optical fibers, which can assure simple and low optical loss interconnectivity with standard optical fibers.

In the embodiments of FIG. 1A through FIG. 5, the optical elements 107 each have an outer dimension Do that is substantially equal to the outer diameter $D_L$ of the lead-in optical fiber 102, 502. However, in some embodiments, the optical element may have a greater or smaller dimension than the lead-in optical fiber.

Figure 6:
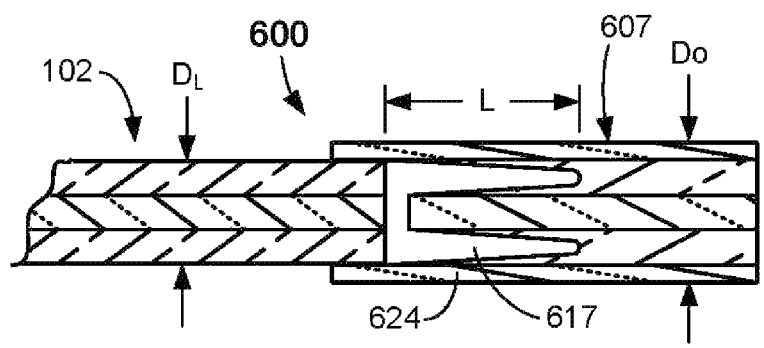
FIG. 6 is a cross-sectioned side view of another embodiment of an optical fiber sensor wherein the optical element has a relatively larger outer dimension than a lead-in optical fiber.

For example, FIG. 6 illustrates an embodiment of the optical fiber sensor 600 including an optical element 607 that has a larger outer dimension Do than an outer dimension $D_L$ of the lead-in optical fiber 102. An embodiment with a larger dimension optical element 607 may be advantageous for some applications, especially those requiring a higher sensitivity of the optical fiber sensor 600, and where the miniature aspect of the optical fiber sensor is less of a concern. The larger dimension optical element 607 may, in general, allow for producing a relatively deeper gutter 617, and, thus, the optical fiber sensor 600 may exhibit a relatively higher sensitivity to applied strain due to a relatively longer length (L) of the active region 624 being provided. The optical element 607 may have the same composition as discussed above for optical element 107 and may exhibit the same relationship between Do and L, i.e., Do/L≥0.5.

Figure 7:
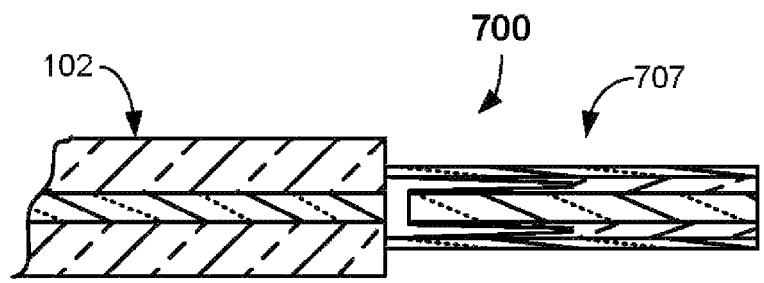
FIG. 7 is cross-sectioned side view of another embodiment of an optical fiber sensor wherein the optical element has a relatively smaller outer dimension than a lead-in optical fiber.

In some embodiments, the diameter of the optical element 707 may be smaller than that of the lead-in fiber 102, such as in FIG. 7, although such an embodiment may not provide additional advantage other than having a smaller dimension at the sensing tip.

Figure 8A:
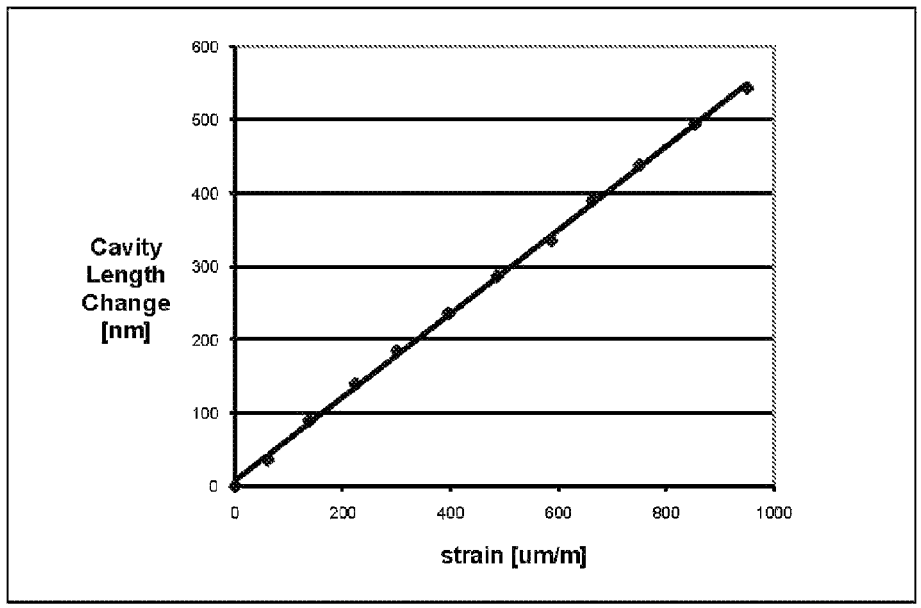
FIG. 8A is a measured change of the cavity length (nm) when the optical fiber sensor according to the present invention is exposed to strain (μm/m).

FIG. 8A demonstrates a typical experimentally-measured optical fiber sensor response for an exemplary optical fiber sensor according to embodiment shown in FIGS. 1A-2. An optical fiber sensor 100 with diameter of 125 µm was glued onto a surface 204 of an object 202 (e.g., a flat steel plate) using an adhesive 206 (e.g., cyanoacrylate glue). The steel plate object 202 was then stressed to different predetermined values by application of an increasing amount of force to a portion of the object 202. The applied stress resulted in progressively increasing strain (in µm/m) on the surface 204 of the object 202. The plot of FIG. 8A illustrates the change in cavity length (nm) of the optical fiber sensor 100 as a function of applied strain in µm/m when referenced forces are applied. The length (L) of the active region 124 of the optical fiber sensor 100 was about 250 µm with optical cavity length (d) of about 7 µm. The total length (Lt) of the optical element 107 was 278 µm. The adhesive 206 covered an area that was considerably longer than active region 124.

In accordance with another aspect of the invention, there are also provided several variants of a method for manufacturing an optical fiber sensors (e.g., 107) described above. The methods presented below are directed at manufacturing of an optical fiber sensor of the invention made from inorganic optical material such as pure or doped silica glass or sapphire.

Referring now to FIG. 9A through FIG. 13 and FIG. 19, illustrated are steps of a method according to first embodiment of the invention. According to the method 1900, a structure-forming fiber (e.g., 900 as shown in FIG. 9A-9B) is provided in 1902 having a suitable material composition. The material composition of the structure-forming fiber 900 may be preferentially doped and dopant concentrations and types may vary radially. The structure-forming fiber 900 may include multiple radial segments. For example, the structure-forming fiber 900 may have a cylindrical central portion 902 of doped silica, an annular inner cladding portion 904 surrounding the central portion 902 having a composition of doped silica that is substantially more preferentially etched than the central portion 902. The doping to achieve preferential etching ensures a relatively higher etching rate when exposed to a common etchant material under the same conditions. Other methods of providing relatively higher etching rate may be provided, such as providing void structures in the annular inner cladding portion 904 such as micro-capillaries or nano-capillaries, or combinations of micro-capillaries or nano-capillaries with differential doping as is explained in more detail below. The structure-forming fiber 900 may include an annular outer portion 906 surrounding the inner cladding portion 904 that is substantially less preferentially doped than both the inner cladding portion 904 and the central portion 902. Accordingly, the annular outer portion 906 may etch at an etching rate less than the central portion 902 and inner cladding portion 904 when exposed to a common etchant material under the same conditions.

The use of the term structure-forming fiber is not meant to infer any particular length, diameter, or structure. For example, the fiber 900 may be a rod. In step 1904 (FIG. 19), a first end 908 (FIG. 10) of the structure-forming fiber 900 that may be cleaved perpendicularly, and is exposed to an etching material 1000 for a sufficient time to reshape the first end 908 and produce an optical element 1100 (See FIG. 11). Typical etching times may be between about 5 minutes and about 15 minutes in 40% HF at 25 C, for example. These values are exemplary only and will depend strongly on the etchant material (e.g., HF) concentration and temperature.

As shown in FIG. 11, the produced optical element 1100 has an outer dimension Do, a pedestal 120, and a gutter 117 surrounding the pedestal 120 having a gutter depth defining an active region 124 of length, L, wherein L/Do≥0.5. Higher levels of preferential doping of the inner cladding portion 904 may achieve relatively longer lengths (L) of the active region 124. Thus, L/Do≥1.0, L/Do≥1.5, L/Do≥2.0, or even L/Do≥3.0 may be achieved through using higher levels of preferential doping.

Figure 12:
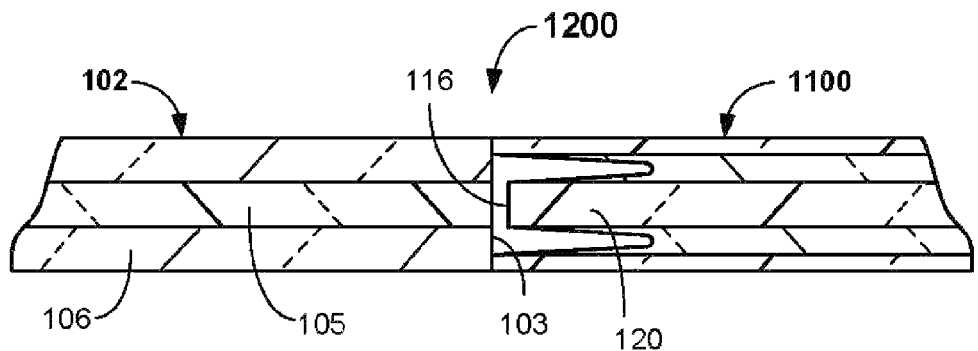
FIG. 12 illustrates a cross-sectioned side view of an optical element bonded to a lead-in optical fiber according to an aspect of the invention.

In another method step 1906 as shown in FIG. 12, the optical element 1100 is bonded (e.g., fused) to an end surface 103 of a lead-in optical fiber 102. The bonding is preferably performed by fusion splicing, however other methods of bonding may be also applied. As mentioned above, the lead-in optical fiber 102 carries a sensing light signal to and from the optical fiber sensor (e.g., 100). In the depicted embodiment, the lead-in optical fiber 102 may include a core 105 and a cladding 106 wherein the core 105 has a relatively higher refractive index than the cladding 106. The diameter of the core 105 may be approximately the same as a diameter of the pedestal 120 at the surface 116.

Figure 13:
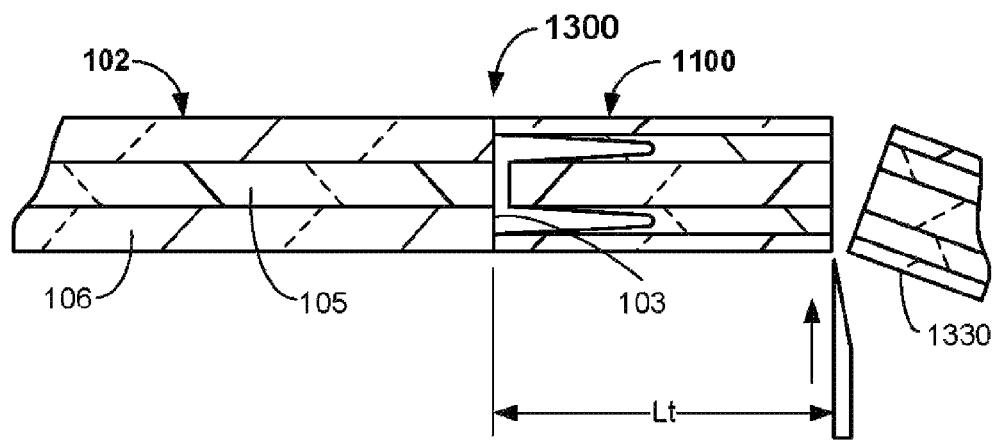
FIG. 13 illustrates a cross-sectioned side view of an optical fiber sensor being trimmed to a desired total length (Lt) according to an aspect of the invention.
Figure 14:
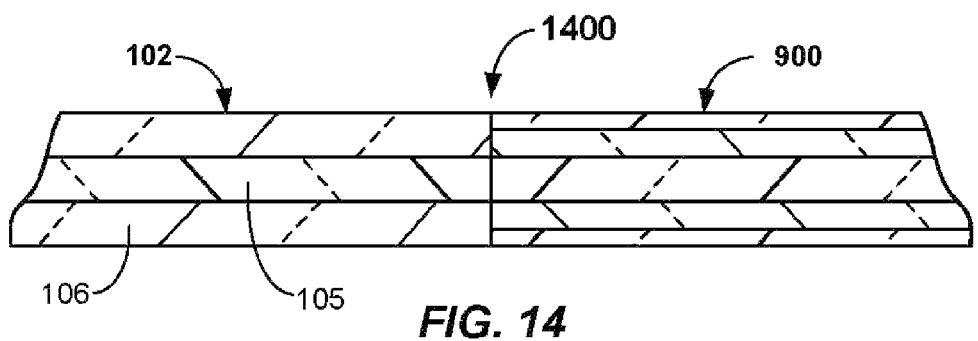
FIG. 14 illustrates a cross-sectioned side view of an assembly of a lead-in optical fiber bonded to a structure-forming fiber according to an aspect of the invention.
Figure 15:
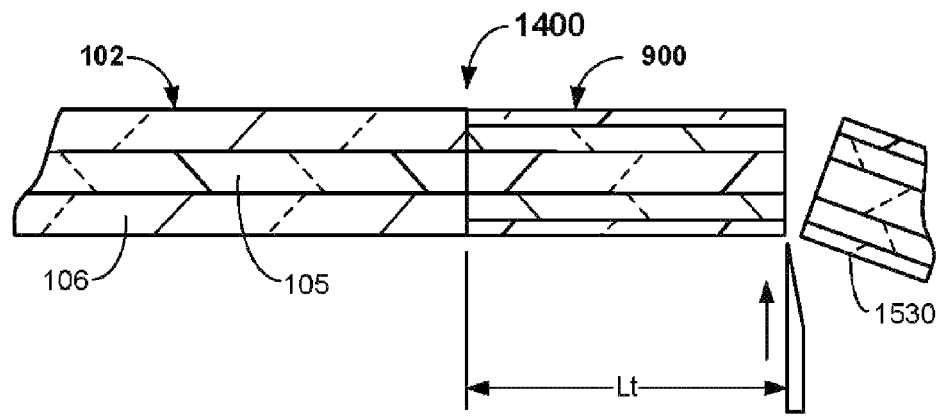
FIG. 15 illustrates a cross-sectioned side view of a structure-forming fiber of the assembly of FIG. 14 being trimmed to a desired total length according to an aspect of the invention.
Figure 19:
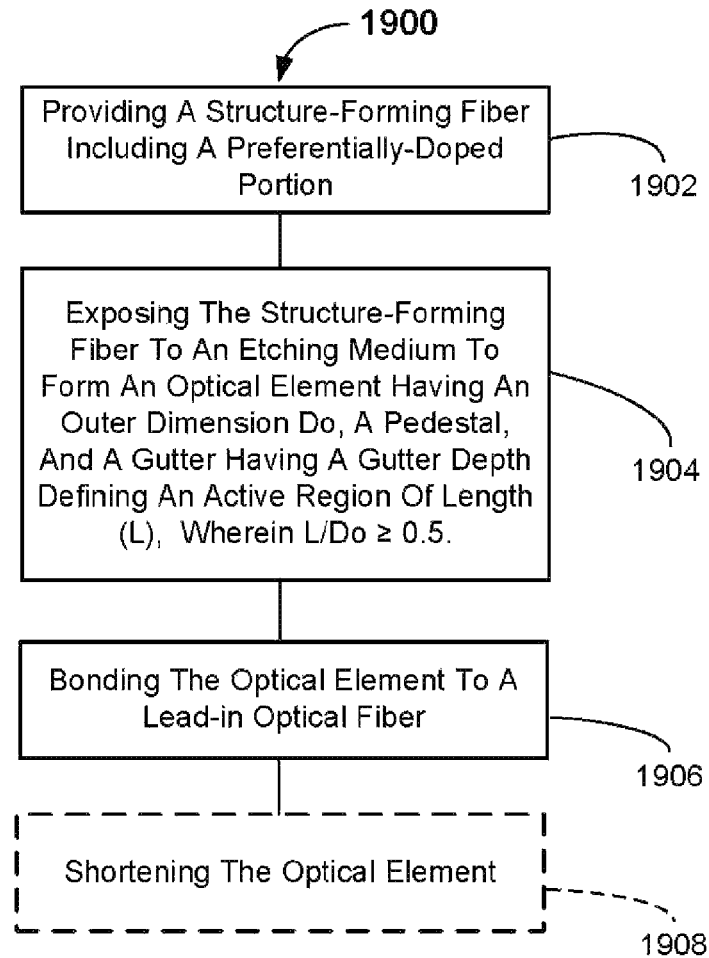
FIG. 19 illustrates a flowchart of a method according to the present invention.

In an optional step 1908 in the method of FIG. 19 as best illustrated in FIG. 13, the optical element 1100 of the optical fiber sensor 1300 may be shortened to the desired length (Lt), the desired dimensions of which are described herein. This step 1908 may be carried out by variety of simple procedures such as for example cutting, cleaving, polishing, or even simple breaking off of the end 1330 of the optical element 1100.

Figure 16:
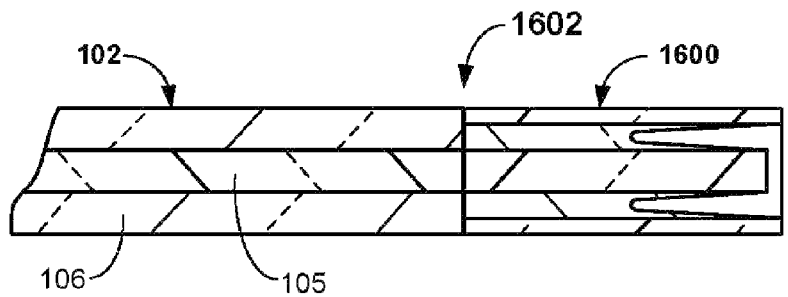
FIG. 16 illustrates a cross-sectioned side view of an assembly after exposure to an etchant medium to form an optical element according to another aspect of the invention.
Figure 17:
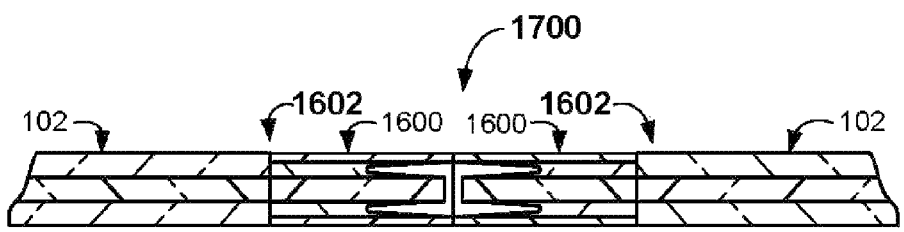
FIG. 17 illustrates a cross-sectioned side view of an assembly after bonding together of two assemblies shown in FIG. 16.
Figure 18:
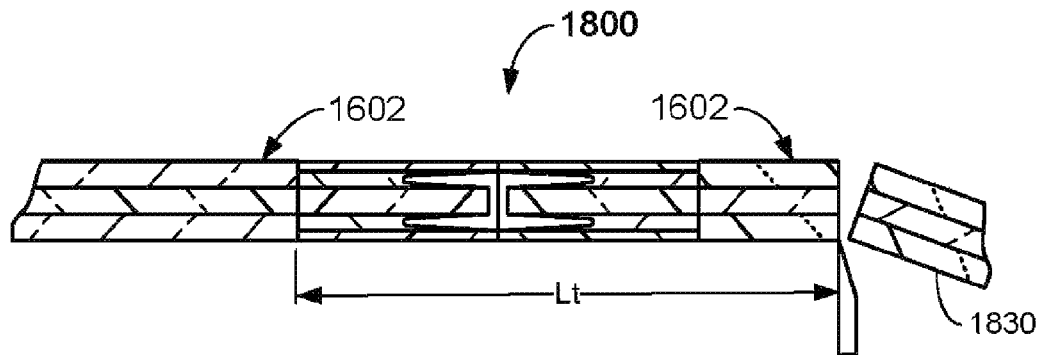
FIG. 18 illustrates a cross-sectioned side view of an optical fiber sensor after trimming to a desired total length (Lt).

FIGS. 14 to 18 illustrate steps of a manufacturing method adapted to manufacture an alternative embodiment of an optical fiber sensor 400 as shown in FIG. 4 wherein a second optical element 407A is coupled between the first optical element 107 and the lead-in optical fiber 102. The first step, shown in FIG. 14, involves bonding a structure-forming fiber 900 as heretofore described to a lead-in optical fiber 102, also as previously described to form a spliced assembly 1400. In the second step, shown in FIG. 15, the structure-forming fiber 900 is trimmed to a desired length dimension (Lt) thereby removing end 1530. In the third step, as shown in FIG. 16, the structure-forming fiber 900 is reshaped by exposure to an etching medium as previously described to produce a spliced assembly 1602 including an optical element 1600, which may be substantially identical to the optical element 1100 of FIG. 11. In the fourth step, shown in FIG. 17, the lead-in optical fiber 102 having been bonded to the optical element 1600 is now coupled via bonding to another assembly, such as assembly 1602 shown on the right side. The assembly 1602 may be identical to the assembly 1602. The assembly 1700 may include an optical element 1600 to form a dual element assembly 1700. In other embodiments, the right assembly 1602 may contain only etched structure-forming fiber as described in FIG. 4. The bonding may be preferably performed by fusion splicing, however other methods of bonding can also be applied. In a last optional step, optional step shown in FIG. 18, the dual assembly 1700 including opposed optical elements 1600 may be shortened to the desired total length (Lt). This step can be carried out by variety of simple procedures such as cutting, cleaving, polishing, or even simple breaking off the end 1830, for example.

The embodiment of optical fiber sensor 500, as shown in FIG. 5, may be formed in a similar manner. The first step involves reshaping structure-forming fiber as heretofore described to form optical element 507A on the end thereof. In the second step, ends of both optical elements 507A and 107 are bonded together (e.g., by fusion splicing or other methods). In the last, optional step, one of the optical elements not used to guide the light to and from the optical fiber sensor 500 is shortened to a desired length. By providing the optical elements in an opening-facing-opening configuration, the length (L) of the active region may be made twice as long.

In order to improve the signal produced by the Fabry-Perot cavity of the optical fiber sensors described herein, semi-reflective coatings may optionally be applied on the respective surfaces forming the Fabry-Perot cavity (e.g., end surfaces 103, reflective surfaces 116, etc.) before bonding.

According to a further aspect, as shown in FIGS. 9A through 11, the structure-forming fiber (e.g., 900) may be formed by etching with an etching material into an optical element (e.g., 1100) that embodies a pedestal 120 having a reflective surface 116 that is retracted from an end 110 by a distance (d) and wherein the pedestal 120 is surrounded by a gutter 117. In some embodiments, the structure-forming fiber 900 has at least three regions of appropriate dimensions as shown in FIGS. 9A and 9B. Each region etches at a different etching rate when exposed to common etching medium (e.g., a gas or liquid). For example, the etching medium may be HF, buffered HF (mixture of HF and $NH_4F$), mixture of isopropyl alcohol and HF, $SF_6$ and similar. A preferably etching medium is HF and isopropyl alcohol. The annular outer cladding portion 906 etches at a relatively slower rate, the inner annular cladding portion 904 etches at a relatively higher rate, and the central portion 902 etches at an intermediate rate that is higher than the etching rate of the outer cladding portion 906, however slower than the etching rate of annular inner cladding portion 904.

The etching rate of individual portions 902, 904, 906 may be manipulated through different mechanisms. For example, in some embodiments, introduction of dopants into a base silica glass leads to change of the etching rate upon exposure to the etching medium. Accordingly, each of the portions may be differentially doped. For example, if a silica glass in the cylindrical central region 902 is doped with $GeO_2$ (e.g., about 30 mol % in silica), which is a relatively standard doping level in a telecommunication multimode fiber, an etching rate in HF increases by approximately ten times when compared to an etching rate of pure silica when also exposed to the same HF etchant medium. Lower $GeO_2$ concentrations may provide proportionally lower etching rates, which may allow for setting of a desired etching rate for the central portion 902 to achieve the desired retraction and length (d). The central portion 902 may have a diameter the same as or slightly larger (to account for any etching thereof) to the diameter of the core 105 of the lead-in fiber 102. For example, the diameter may be about 50 µm if a 50 µm MMF is used as the lead-in fiber, or about 10 µm if a single mode fiber is used for the lead in-fiber. Other diameters may be used depending upon the optical design. An etching rate of the annular inner cladding region 904 is made relatively higher to achieve the long length (L) of the active region 124, and, thus, relatively high sensitivity of the optical fiber sensor 1100 to the strain. A suitable dopant for the annular inner cladding region 904 that may increase the etching rate in HF at even moderate doping levels is $P_2O_5$ (e.g., concentrations of about 3 mol % to about 20%, or even about 3% to about 35 mol % in silica or more). The annular inner cladding region 904 may include a thickness of between about 1 µm to about 15 µm. Other dimensions may be used. However, making the annular inner cladding region 904 relatively thin is believed to maximize achievable depth of the gutter 117 as isotropic etching will causes axial/radial removal of material. The annular outer cladding region 906 may be substantially-pure silica. The outer dimension of the annular outer cladding region 906 may be approximately equal to the lead-in fiber 102. The structure-forming fiber 900 may be drawn using conventional fiber drawing methods from a fiber preform or boule. The fiber preform may be manufactured by an outside vapor deposition (OVD) method, an inside vapor deposition (e.g., modified chemical vapor deposition—MCVD), rod-in-tube methods, stack-and-draw methods, or other suitable preform manufacturing methods known to those of skill in the art.

In embodiments where differential doping is used to manipulate the etching rate in the etching medium and thereby reshape the structure-forming fiber 900 into an optical element (e.g., 1100), it may be advantageous in some embodiments to introduce an additional barrier region 909 into the structure-forming optical fiber (see FIG. 9C). This barrier region 909 may be provided between the central portion 902 and first cladding portion 904 and should etch at a relatively slower etching rate (e.g. at the same rate as the outer cladding portion 906). The purpose of the barrier region 909 is to reduce a transverse (radial) etching rate of the central portion 902 that would otherwise be etched at a moderate etching rate. This aids in achieving a long length (L) of the active region 124. The introduction of the barrier region 909 may therefore reduce an angle (e.g., taper) of the gutter inner walls (See 118, 119 of FIG. 1A), and, thus, allows for longer etching time that leads to longer gutter and higher final sensor sensitivity. The barrier region 909 therefore acts as a barrier that protects central portion 902 from excessive radial (e.g., side) etching. Additional differentially doped layers may be added.

The barrier region 909 may be made of substantially pure silica to achieve a relatively low etching rate in the etchant medium (e.g., HF). Radial thickness of the barrier region 909 may be between about 5 µm and about 50 µm. Other thicknesses may be used. It should be recognized that the provision of a barrier region 909 may also provide a relatively low refractive index of the barrier region 909 when compared to the refractive index of central portion 902 that may be doped with an index-raising dopant (e.g., germania), and, thus, may have a relatively higher refractive index than pure silica. This contrast in refractive index between the central portion 902 and the barrier region 909 creates a waveguide structure that may guide light along optical element 1100.

Waveguide structure in the optical element 1100 may also be created by proper doping of the central portion 902. A single dopant or combinations of dopants that significantly increase refractive index of the silica without significant influence on etching rate may be used. In some embodiments, $TiO_2$ may be used as a dopant for the central portion 902. For example, about 2 mol % to about 7 mol % $TiO_2$ in silica may be used. In this case an appropriate index contrast may be achieved between central portion 902 and annular inner radial portion 904 being doped with about 3 mol % to about 20 mol % $P_2O_5$ in silica, or even about 3 mol % to about 35 mol % $P_2O_5$ in silica, or by the use of a substantially pure silica barrier region as described above.

Figure 21:
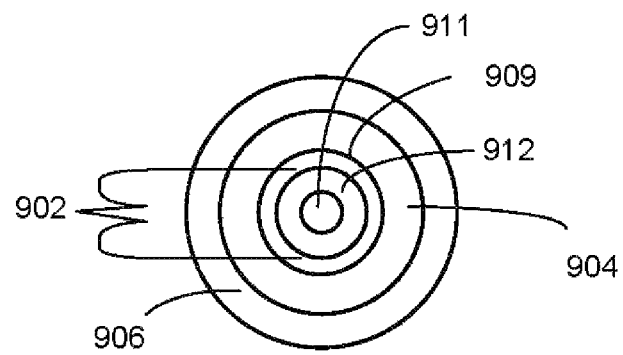
FIG. 21 illustrates an end view of a structure-forming fiber according to an aspect of the present invention.

Further refinement in control over waveguide structure cross section dimensions can be achieved by combination of two dopants in the central portion 902. The use of two dopants may provide refractive index contrast within the central portion 902, while at the same instance providing a uniform etching rate across the central portion 902. More specifically, as shown in FIG. 21, the central portion 902 may be split into two sub-regions 911, 912, e.g. to the inner sub-region 911 and an outer sub-region 912. The inner sub-region 911 may be silica doped with TiO2 (e.g., 2.0 mol % or more in silica) that considerably increases refractive index, but only moderately increases the etching rate. The outer sub-region 912 may be silica doped with dopant or combination of dopants that increases the etching rate but induces limited change in refractive index (e.g. $P_2O_5$, less than 1 mol % in silica). Proper adjustment of dopant levels may lead to the creation of index contrast between the inner sub-region 911 and outer sub-region 912 while providing uniform etching of the entire central portion 902. Such a configuration may create a waveguide structure of preferred diameter, while the entire central portion 902 etches into uniform and flat end surface and thus forms retracted reflective surface 116 of the optical element 1100.

The etching rate of individual layers or portions in the structure-forming fiber may also be manipulated through mechanisms other than by differential doping, or by other methods in addition to differential doping. Creation of layers or portions that include small voids may be provided. For example, the void structures may be provided by including porosity or micrometer-size or nanometer-size capillaries in the structure-forming fiber. Such layers or portions including void structures may etch at considerably different rates due to capillary action/force that draws the etching medium (e.g., acid) deep into capillaries, as compared to an etching rate in bulk glass layers (e.g., not including such porosity or capillaries). Introduction of micro-size or nano-size capillaries may be suitable for creation of the inner annular cladding portion 904 that forms the gutter 117 upon etching and that generally needs to etch at a highest relative rate. Capillaries may be formed by formation of fiber preform using stack and draw method wherein hollow tubes are arranged in a bundle and drawn, drilling of the fiber preform, by formation of porous layers in fiber production, or other known fiber production process typically used in photonic crystal production. The void structures may be provided in a sufficient amount to provide a density reduction of about 20% to 70% as compared to bulk glass, for example. Capillaries may have a mean diameter size of between about 0.01 μm and 20 μm, for example. Other dimensions may be used. Combinations of the above void structures with differential doping may also be used.

Exemplary designs of the optical element and structure-forming fibers thereof are described in Tables 1 and 2 below. These are exemplary only, and other suitable design variations may be used. Table 1 is directed at an embodiment including a barrier layer 909 formed around the central portion 902. Table 2 is directed at a design having no barrier layer around the central portion 902.

TABLE 1

Optical Element and Structure-Forming Fiber Designs

| | Lead-in fiber properties | Case 1 50 μm core, 125 μm OD fiber | Case 2 10 μm core, 125 μm OD fiber | Case 3 50 μm core, 140 μm OD fiber | Case 4 10 μm core, 140 μm OD fiber | Case 5 50 μm core, 200 μm OD fiber | Case 6 10 μm core, 200 μm OD fiber |
|---|---|---|---|---|---|---|---|
| Exemplary Optical Element | Wall thickness (Tw) μm | 5 | 5 | 7 | 7 | 7 | 7 |
| | Optical cavity length (d) μm | 5 | 5 | 5 | 5 | 5 | 5 |
| | length (L) of active region (minimum) μm | 280 | 550 | 350 | 600 | 750 | 1000 |
| | Reflective surface (116) diameter μm | 50 | 10 | 50 | 10 | 50 | 10 |
| Structure-Forming Fiber | Inner cladding portion (904) thickness μm | 10 | 10 | 10 | 10 | 10 | 10 |
| | Central portion (902) diameter μm | 50 | 10 | 50 | 10 | 50 | 10 |
| | Barrier region (909) thickness μm | 11 | 21 | 14 | 24 | 29 | 39 |
| | Outer diameter μm | 147.5 | 167.5 | 168 | 188 | 258 | 278 |
| | Relatively higher etching rate of the central portion (902) | 1.44 | 1.24 | 1.36 | 1.21 | 1.17 | 1.13 |
| | Minimal relatively higher etching rate of the inner cladding portion (904) | 30 | 30 | 30 | 30 | 30 | 30 |
| Expected Performance | Final sensor active length L | 326 | 616 | 406 | 696 | 841 | 1131 |
| | L/Do (estimated L/Do ratio) | 2.6 | 4.9 | 2.9 | 5.0 | 4.2 | 5.7 |

TABLE 2

Optical Element and Structure-Forming Fiber Designs

| | Lead-in fiber properties | Case 7 50 um core, 125 um OD fiber | Case 8 10 um core, 125 um OD fiber | Case 9 50 um core, 140 um OD fiber | Case 10 10 um core, 140 um OD fiber | Case 11 50 um core, 200 um OD fiber | Case 12 10 um core, 200 um OD fiber |
|---|---|---|---|---|---|---|---|
| Exemplary Optical Element | Wall thickness (Tw) μm | 5 | 5 | 7 | 7 | 7 | 7 |
| | Optical cavity length (d) μm | 5 | 5 | 5 | 5 | 5 | 5 |
| | (Minimum) active region of length (L) μm | 220 | 470 | 280 | 550 | 650 | 900 |
| | Reflective surface (116) diameter μm | 50 | 10 | 50 | 10 | 50 | 10 |
| Structure-Forming Fiber | Inner cladding portion (904) thickness μm | 10 | 10 | 10 | 10 | 10 | 10 |
| | Central portion (902) diameter μm | 67.5 | 47.5 | 73 | 53 | 103 | 83 |

TABLE 2-continued

Optical Element and Structure-Forming Fiber Designs

|  | Lead-in fiber properties | Case 7 50 um core, 125 um OD fiber | Case 8 10 um core, 125 um OD fiber | Case 9 50 um core, 140 um OD fiber | Case 10 10 um core, 140 um OD fiber | Case 11 50 um core, 200 um OD fiber | Case 12 10 um core, 200 um OD fiber |
|---|---|---|---|---|---|---|---|
|  | Structure-forming fiber outer diameter μm | 143 | 163 | 163 | 183 | 253 | 273 |
|  | Relatively higher etching rate of the central portion (902) μm | 1.6 | 1.3 | 1.4 | 1.2 | 1.2 | 1.1 |
|  | Minimal relatively higher etching rate of the inner cladding portion (904) μm | 30 | 30 | 30 | 30 | 30 | 30 |
| Expected Performance | Final sensor active length L μm | 254 | 544 | 334 | 624 | 769 | 1059 |
|  | L/Do (estimated L/Do ratio) | 2.0 | 4.4 | 2.4 | 4.5 | 3.8 | 5.3 |

The dimensions, doping levels and composition of regions that form structure-forming fiber may be varied depending upon the desired sensor system specifications and properties. Among the variables are:

a) lead-in fiber outer diameter (OD),
b) thickness of inner cladding portion (904),
c) desired optical cavity length (d),
d) active region length (L),
e) diameter of reflective surface 116, and
f) minimum sensor wall thickness (Tw).

While the lead-in fiber outer diameter (OD) may be arbitrary, the standard dimension of 125 um, is often desired for practical reasons. Larger dimension of lead-in fibers might be also of interest due to the possibility to design sensors with larger optical element diameter and consequently larger active region length (L) that may result in higher sensor sensitivity. The active region length (L) is correlated with structure-forming fiber diameter mainly due to the isotropic etching process that removes some of the low etching rate material/regions in all exposed directions including radial direction, e.g. low etching rate region such as silica outer cladding will be also etched in radial direction from the inside (gutter side). Larger outer diameters of the structure-forming fiber thus allows for longer etching times and consequently deeper gutters.

The active region length (L) determines the sensor system's strain sensitivity. In most practical applications it should be chosen to be as long as possible. This dimension will be determined by relatively higher etching rate of the inner cladding portion 904 and available material/space around the inner cladding portion 904 as described in previously.

The optical cavity length (d) of the sensor is mainly determined by signal interrogation principle that is used in measurement system and can range from few micrometers up to about 50 μm or even more. In accordance with the present invention, the cavity length (d) can be thus chosen to fit most known signal integration systems.

The inner cladding portion (904) thickness, when present, may be made sufficiently thick to allow for exchange between etching by-products generated within the gutter during etching and bulk of the etching medium. Typically this thickness may be in the range of 3-15 μm.

The diameter of the reflective surface 116 is mainly governed by lead-in fiber core diameter. The lead-in fiber core diameter depends on signal processing technique and can be in generally single mode or multimode. In the later case, the core is typically 50 μm or more in diameter, while in the first case the core diameter is usually below 10 μm. In order to reflect back significant portion of the incoming light the reflective surface 116 may have dimensions substantially similar to lead-in fiber core diameter. Larger diameters of reflective surface 116 than of lead-in fiber core diameter are also possible, but are in generally less practical as they limit the size of the fiber cross sectional area that is available for radial etching of the area surrounding gutter 117 as explained above.

Minimum sensor wall thickness Tw is mainly determined by minimum acceptable tensile strength of the optical sensor system. The minimum optical sensor wall thickens that occurs at the bonding surface between lead-in fiber and optical element is a region of the sensor where the highest mechanical stress is concentrated. Depending on the strain range and dynamic load conditions, a certain minimum sensor wall thickness is required to provide desired sensor durability and desired life expectancy. Sensor wall thickness may be, for example, in the range between about 2 μm and 30 μm or even more, especially when large diameter optical elements are utilized.

As briefly described above, there are many design parameters that determine optical sensor and consequently structure-forming fiber design. A few examples of possible structure-forming fiber designs based on particular sets of input parameters (including various lead-in fiber parameters) are given in Tables 1 and 2 for both embodiments (the embodiments with and without barrier region 909). In addition to the input parameters, the following additional conditions were used in the optical sensor of Table 1 and 2.

1) All optical elements have substantially a same outer diameter as the lead-in fiber.

2) The relatively higher etching rate of the inner cladding portion 904 in the etching medium is about 30 times higher than an etching rate of substantially pure silica.

3) The structure-forming fiber is etched from its initial diameter to the outer diameter corresponding to the lead-in fiber diameter.

The dimensions of structure-forming fibers and optical elements shown in Table 1 and 2 above are exemplary. Other dimensions are possible.

Another manipulation of the etching rate can be achieved by intense illumination of particular portion or layer (e.g., the gutter-forming portion 904) with an ultraviolet light that creates microcracks in the illuminated glass. Such portions including microcracks may etch at considerably higher rate than normal uniform bulk glass. Detail description of this phenomenon is described in "Shape control of microchannels fabricated in fused silica by femtosecond laser irradiation and chemical etching," Opt. Express, volume 17, 8685-8695 (2009) by Vishnubhatla et al, the disclosure of which is hereby incorporated by reference herein.

Figure 20:
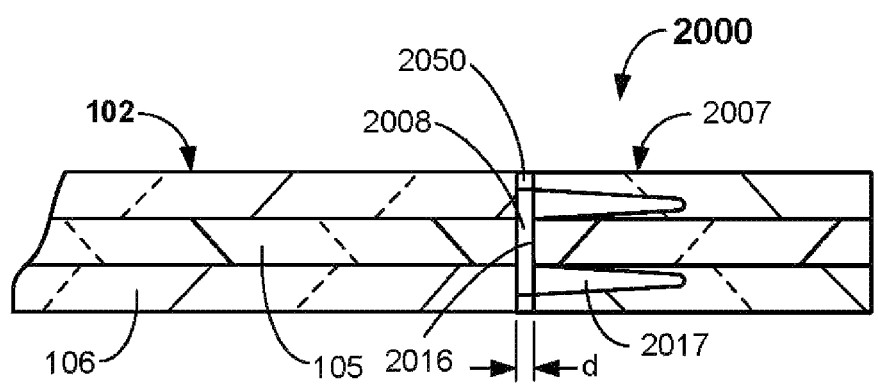
FIG. 20 illustrates a cross-sectioned side view of an optical fiber sensor including a spacer of length (d) according to an aspect of the present invention.

As shown in FIG. 20, a optical fiber sensor 2000 including optical element 2007 may also be produced by lithographic process that involves masking an end of the structure-forming fiber and then etching the gutter 2017 using a lithographic process or by a direct laser micromachining method. Micromachining using a pico-second or femto-second laser may be used. In such methods, creation of a gutter 2017 in the optical element 2007 may be provided. However a retraction of the reflective surface 2016 must be separately created. The length (d) of the optical cavity 2008 may be adjusted by bonding (e.g., fusion bonding) a short spacer 2050 of length (d) made from a silica glass tubular capillary in-between the lead-in fiber 102 and lithographically etched or micro-machined member. However, it should be recognized that a simple manufacturing method may be achieved by differential etching method as described herein.

Figure 22:
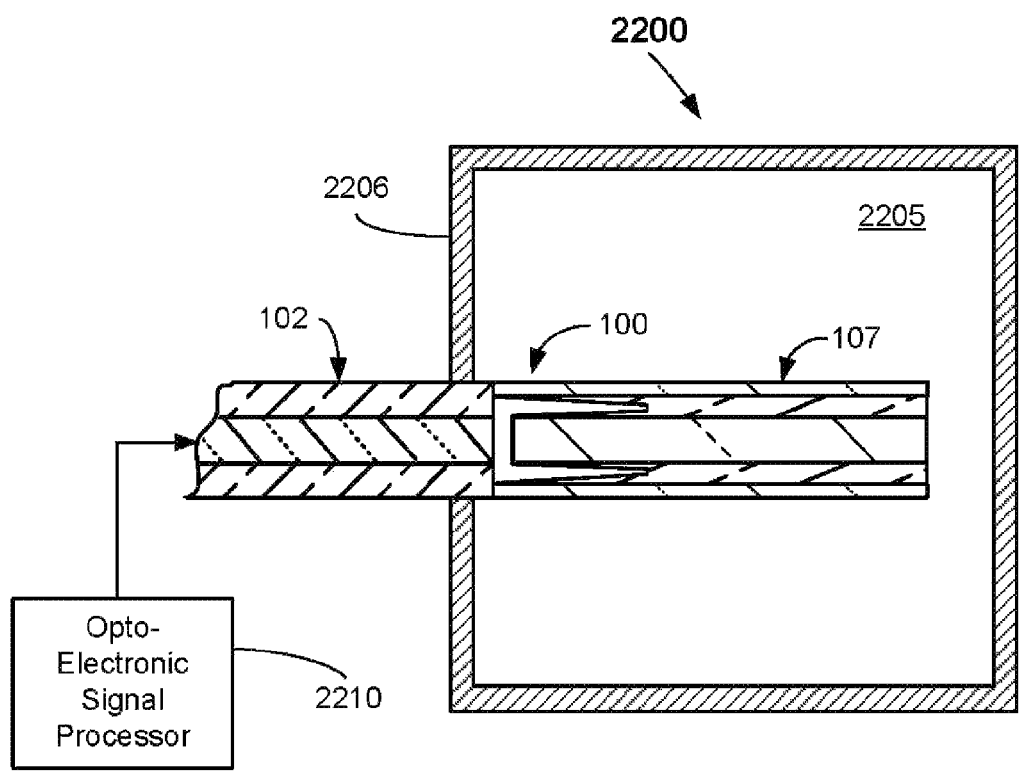
FIG. 22 illustrates a cross-sectioned side view of an optical fiber sensor in a pressure chamber according to an aspect of the present invention.

In another installation configuration, the optical fiber sensor 100 of the invention may be part of a pressure measurement system 2200 that is adapted to measure a pressure of a space such as a chamber 2205. For example, the optical fiber sensor 100 may be mounted to the walls 2206 of the chamber 2205 or otherwise included in or interconnected to the chamber 2205 undergoing a pressure change sought to be measured, as is shown in FIG. 22. The optical fiber sensor 100 may include a limited section of lead-in optical fiber 102. At least a portion of the body of the optical element 107 and possibly part of the lead-in optical fiber 102 may be received in the chamber 2205 undergoing a pressure change. Pressure exposure to the optical element 107 causes localized strain along the active region of the optical fiber sensor 100 that may be measured by the optical fiber sensor 100 and pressure measurement system 2200.

Figure 8B:
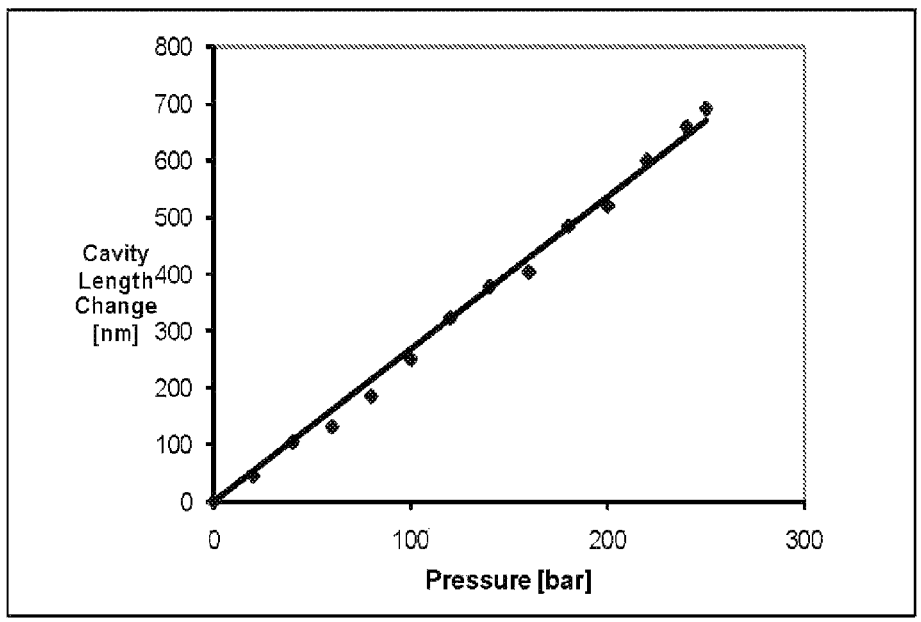
FIG. 8B is a measured change of the cavity length (nm) when the optical fiber sensor according to the present invention is exposed to pressure (bar).

An opto-electronic signal processor 2210 may be coupled to the optical fiber sensor 100 and is adapted to pass and receive light signals to and from the lead-in fiber 102. The signal processor 2210 is operable to receive light signals reflected from at least the retracted surface of the optical element 107, and determine a pressure applied to the optical fiber sensor 100 based upon length changes of the active region of the optical element 107. Any suitable opto-electronic signal processor 2210 known in the art may be used to interrogate the optical fiber sensor 100. The lead-in fiber 102 may attached directly to the opto-electronic signal processor 2210 or may be connected (e.g., spliced) to one or more additional segments of optical fiber that attach to the opto-electronic signal processor 2210. The plot of FIG. 8B illustrates typical change in cavity length (nm) of the optical fiber sensor 100 as a function of applied pressure in bar.

The foregoing description discloses only exemplary embodiments of the invention. Modifications of the above-disclosed apparatus, systems, and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

The invention claimed is:

1. An optical fiber sensor, comprising:
   a lead-in optical fiber having an end surface at a forward end;
   a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, wherein L is defined by a forward end of the lead-in optical fiber and a bottom of the gutter, the first optical element further exhibiting L/Do≥0.5 wherein the gutter includes an inner gutter wall and an outer gutter wall, such that the inner gutter wall and the outer gutter wall are tapered relative to an optical element longitudinal axis so as to define a generally conical-shape to the pedestal.

2. The optical fiber sensor of claim 1, wherein the pedestal includes a generally planar reflective surface on a terminal rearward facing end, such that the tapered inner gutter wall and the reflective surface define a frusto-cone shape to form to the pedestal of the optical element.

3. An optical fiber sensor, comprising:
   a lead-in optical fiber having an end surface at a forward end;
   at least one optical element having an outer dimension, Do, a front end surface coupled to the lead-in optical fiber, a pedestal including a retracted surface that is spaced from the front end surface, the retracted surface at least partially defining an optical cavity, a gutter that penetrates forward into a solid support base and surrounds a reflective surface and the pedestal, the gutter having a gutter depth defining an active region of length, L, wherein L is defined by a forward end of the lead-in optical fiber and a bottom of the gutter, the at least one optical element further exhibiting L/Do≥0.5,
   wherein an axial elongation of the active region relative to an optical element longitudinal axis corresponds to a length change of dimension (d) of the cavity.

4. The optical fiber sensor of claim 3, comprising L/Do≥1.0.

5. The optical fiber sensor of claim 3, comprising L/Do≥1.5.

6. The optical fiber sensor of claim 3, comprising L/Do≥2.0.

7. The optical fiber sensor of claim 3, wherein a material etched to form the gutter comprises $P_2O_5$-doped silica.

8. The optical fiber sensor of claim 3, wherein the first optical element includes a tail portion that extends beyond a forward end of the gutter by a distance greater than Do/2.

9. The optical fiber sensor of claim 8, wherein the first optical element includes a tail portion that extends beyond a forward end of the gutter by a distance greater than Do.

10. The optical fiber sensor of claim 8, wherein the tail portion extends beyond the forward end of the gutter by a distance greater than or equal to 5Do.

11. The optical fiber sensor of claim 3, comprising a spacer.

12. The optical fiber sensor of claim 3, further comprising a second optical element coupled between the lead-in optical fiber and the first optical element.

13. The optical fiber sensor of claim 12, wherein the second optical element comprises a second pedestal and a second gutter, and wherein the gutter of the first optical element and the second gutter of the second optical element each having openings that open towards each other.

14. The optical fiber sensor of claim 12, wherein the first optical element comprises an outer annulus including the active region.

15. The optical fiber sensor of claim 3, wherein the forward end of the lead-in optical fiber optical comprises an optical element.

16. The optical fiber sensor of claim 3, wherein the gutter is formed from a material comprising micro-capillaries or nano-capillaries.

17. A strain measurement system, comprising:
the optical fiber sensor of claim 3 adapted to be coupleable to an object undergoing strain, the optical fiber sensor including a lead-in optical fiber and an optical element coupled thereto, the optical element having an outer dimension, Do, and a pedestal including a retracted surface that is spaced from the front end surface, the retracted surface at least partially defining an optical cavity, a gutter that penetrates forward into a solid support base and surrounds a reflective surface and the pedestal, the gutter having a gutter depth defining an active region of length, L, wherein L is defined by a forward end of the lead-in optical fiber and a bottom of the gutter, the at least one optical element further exhibiting $L/Do \geq 0.5$, wherein an axial elongation of the active region relative to an optical element longitudinal axis corresponds to a length change of dimension (d) of the cavity and
a signal processor coupled to the optical fiber sensor, the signal processor operable to:
generate and pass a light signal into the lead-in optical fiber,
receive a reflected light signal from at least the retracted surface of the optical fiber sensor, and
determine a strain applied to the object.

18. A method of using the optical fiber sensor of claim 3, comprising:
providing the optical fiber sensor of claim 3 having a lead-in optical fiber having an end surface at a forward end, and a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, the first optical element further exhibiting $L/Do \geq 0.5$ and wherein an axial elongation of the active region relative to an optical element longitudinal axis corresponds to a length change of dimension (d) of the cavity;
coupling at least a portion of the body of the first optical element to an object undergoing strain;
passing a light signal into the lead-in optical fiber from a signal processor, the signal processor operable to:
receiving a light signal reflected from at least the retracted surface of the first optical element, and
determine a strain applied to the object.

19. A method of using an optical fiber sensor of claim 3, comprising:
providing the optical fiber sensor of claim 3 having a lead-in optical fiber having an end surface at a forward end, and a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, the first optical element further exhibiting $L/Do \geq 0.5$ and wherein an axial elongation of the active region relative to an optical element longitudinal axis corresponds to a length change of dimension (d) of the cavity;
providing at least a portion of the body of the first optical element in a space undergoing pressure changes;
passing a light signal into the lead-in optical fiber from a signal processor, the signal processor operable to:
receiving a light signal reflected from at least the retracted surface of the first optical element, and
determining a pressure applied based upon length changes in the active region of the first optical element.

20. An optical fiber sensor, comprising:
a lead-in optical fiber having an end surface at a forward end;
a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, the first optical element further exhibiting $L/Do \geq 0.5$,
wherein the first optical element includes an outer annulus surrounding the gutter, the first optical element having a composition of: $P_2O_5$-doped silica in an axial region adjacent to the gutter; doped silica in the pedestal having a refractive index increasing dopant; and
substantially-pure silica in the outer annulus.

21. A method of manufacturing the optical fiber sensor of claim 20, comprising:
providing a structure-forming fiber having a central portion having a composition of doped silica, an annular inner cladding portion surrounding the central portion having a composition of doped silica that is preferentially doped to provide an etching rate in an etching medium greater than the central portion, and an outer annulus portion surrounding the gutter portion and having a composition of substantially pure silica to provide an etching rate in the etching medium less than both the central portion and the annular inner cladding portion; and
exposing an end of the first optical fiber segment to an etchant for a sufficient time to produce an outer dimension Do, pedestal, and a gutter surrounding the pedestal having a gutter depth defining an active region of length, L, wherein $L/Do \geq 0.5$ wherein a composition of doped silica of the annular inner cladding portion is $P_2O_5$-doped silica.

22. The method of claim 21, wherein the annular inner cladding portion comprises capillaries.

23. An optical fiber sensor, comprising:
a lead-in optical fiber having an end surface at a forward end;
a first optical element having a body with an outer dimension, Do, a front end surface coupled to the lead-in optical fiber, a pedestal including a retracted surface that is spaced from the front end surface, the retracted surface at least partially defining an optical cavity, a gutter surrounding the pedestal, the gutter having a gutter depth defining an active region of length, L, wherein L is defined by a forward end of the lead-in optical fiber and a bottom of the gutter, the first optical element further exhibiting $L/D_o \geq 0.5$ and wherein the first optical element includes a tail portion extends beyond the forward end of the gutter by a distance greater than or equal to $10D_o$.

* * * * *